United States Patent [19]

Flanagan

[11] Patent Number: 4,660,858
[45] Date of Patent: Apr. 28, 1987

[54] HOT MELT ADHESIVE COMPOSITION FOR BOOK LINING

[75] Inventor: Thomas P. Flanagan, Green Brook, N.J.

[73] Assignee: National Starch and Chemical Corporation, Bridgewater, N.J.

[21] Appl. No.: 831,760

[22] Filed: Feb. 20, 1986

[51] Int. Cl.$^4$ ............................................. B32B 27/10
[52] U.S. Cl. ..................................... 281/21 R; 412/8
[58] Field of Search ........................... 281/21 R; 412/8

[56] References Cited

U.S. PATENT DOCUMENTS

| | | | |
|---|---|---|---|
| 3,239,478 | 3/1966 | Harlan | 260/27 |
| 3,615,106 | 10/1971 | Flanagan et al. | 281/21 |
| 3,837,994 | 9/1974 | Flanagan et al. | 161/100 |
| 4,019,758 | 4/1977 | Heller et al. | 281/21 R |
| 4,091,487 | 5/1978 | Axelrod | 11/1 AD |
| 4,187,572 | 2/1980 | Savich | 11/2 |
| 4,405,156 | 9/1983 | Carter et al. | 281/29 |
| 4,420,282 | 12/1983 | Axelrod | 412/4 |
| 4,526,577 | 7/1985 | Schmidt et al. | 604/366 |
| 4,536,012 | 8/1985 | Hume, III | 281/21 R |
| 4,578,302 | 3/1986 | Schmidt et al. | 428/110 |

OTHER PUBLICATIONS

Lee M. Klinefelter: Bookbinding Made Easy–pp. 40 and 41 (1960).
U.S. Ser. No. 749,341 filed 06/27/85 (now allowed).
"Bookbinding", James B. Blaine, Presented by Book Production Magazine; Freund Publishing Co., Inc., New York, N.Y.
"A New Look at Animal Glue for Casemaking" Nathan B. Leitner; Marketing Manager of Bookbinding/Graphic Arts, H. B. Fuller Company.

*Primary Examiner*—Veronica P. Hoke
*Attorney, Agent, or Firm*—Ellen T. Dec; Edwin M. Szala

[57] ABSTRACT

Hard bound books are disclosed wherein the lining adhesive is a hot melt pressure sensitive adhesive composition comprising:

(a) 20 to 35% by weight of an A-B-A block or A-B-A-B-A-B multi-block copolymer where the A component is styrene and the B component is butadiene or hydrogenated butadiene and the copolymer contains at least 28 parts styrene per 100 parts copolymer;
(b) 45 to 70% by weight of a compatible tackifying resin;
(c) 5 to 30% by weight of a plasticizing oil;
(d) 0 to 5% by weight of a petroleum derived wax; and
(e) 0.1 to 2% by weight of a stabilizer.

12 Claims, No Drawings

HOT MELT ADHESIVE COMPOSITION FOR BOOK LINING

BACKGROUND OF THE INVENTION

The present invention is directed to pressure sensitive hot melt adhesives used as lining adhesives in the production of hard bound books.

"Hard bound" books conventionally consist of two main components: the case and the body. The case comprises the front and back covers connected by the spine. The body of the book, also known as the "block", is comprised of a plurality of paper sheets or "leaves" which are generally sewn together along their center folds in groups to form the sections or "signatures" of the book. The signatures are then assembled to form the body of the book. At the front and back of the body are affixed heavy folded pages, "end papers", which facilitate the attachment or "casing-in" of the body to the case.

Alternatively, the book block may be formed using a "perfect binding" technique. In this operation, the pages are printed in long, continuous sheets or webs which are cut, folded and properly arranged to form a series of stacks, referred to as signatures, which are then fed into a continuous, revolving chain equipped with clamps. The free edges of the clamped sheets are first cut to remove the signature folds and then roughed so as to expose a maximum amount of fibers at the edges of the sheets and to make them more receptive to the adhesive composition. A layer or coat of a hot melt adhesive composition is then applied in molten form by means of a suitable applicator, after which the end papers are applied before the molten adhesive sets to form the spine of the book. A third procedure for the production of the book block involves the burst, perforate or notched method where the book block maintains the signature fold but contains burst, perforations or notches into the innermost page of the signature and wherein the adhesive is applied to the burst, perforate or notched signature to form the book block.

After the block is formed, the next step in the manufacture of books is rounding and backing if the book is intended to have a curved or rounded configuration. After the rounding, a reinforcing material called a "super" or "crash" is applied to the spine. This is done by gluing the center of the guaze-like scrim "super" or "crash" to the book block or spine. The ends of the scrim extend about ⅞ inch along the outside of the end papers on either side of the body. After the scrim or super is applied, a second coat of adhesive is typically applied and a kraft strip, with optional headband, is applied. In some operations, sufficient adhesive is applied in the gluing of the scrim to penetrate the scrim and, in these cases, the second adhesive coating step is not required. The kraft backing applied in registered relation to the book spine, the optional headbands and the scrim combine to form the conventional lining for the book.

The lined book block is then inserted into the case so the folds in the end papers are adjacent the spine of the case. Adhesive is applied to the front and back end papers adjacent the inside of the covers of the case. The end papers are pasted to the inside of the covers, enclosing the crash. The case and body are then passed through a "building in" operation to form the groove at the either edge of the case spine or placed in a press. When the attachment process, termed "casing-in" is complete, the "body" is bound to the cover incorporating a hinge so that the covers and leaves are movable with respect to each other.

Since there is no direct attachment of the book spine to the cover, it will be recognized that the lining operation and the materials used therein are critical to the production of a satisfactory book. Specifically, the adhesive(s) used to attach the scrim and kraft liners must be sufficiently low in viscosity (e.g. 500 to 5000 cps at 350° F.) to facilitate application; they must not bleed through the kraft; they must exhibit superior adhesive and cohesive strength; the films formed therefrom must be flexible to allow for easy opening even at low temperatures so as to resist "cold cracks" and yet must not flow or creep at room temperature or at elevated temperatures.

Non-pressure sensitive hot melt adhesives have recently replaced animal glues in these applications but these adhesives are deficient with respect to their open time. This lack of open time creates a serious problem in the automated book binding process where interruptions, slow downs and even shut downs of the manufacturing line result in loss of agressive tack properties with the subsequent need to discard large quantities of partially completed products. Another problem consequent with many of the hot melt adhesives presently used for this application is their high level of rigidity when solidified, resulting in a stiff backbone which is not desired for an "easy opening" book.

It is therefore a object of the present invention to provide an adhesive composition for lining hard bound books which has the cohesive strength, temperature resistance, etc. of previous adhesives without being limited with respect to loss of agressive tack over time.

It is further object of the invention to provide an adhesive composition for lining hard bound books which remains flexible so as to produce an easy opening book.

These and other objects will be apparent from the description that follows.

SUMMARY OF THE INVENTION

We have now found that pressure sensitive hot melt compositions prepared from specific A-B-A type block and multi-block copolymers are particularly useful as lining adhesives in the production of hard bound books.

Thus, the present invention is directed to a process for lining hard bound book blocks comprising the steps of: applying a molten film of a hot melt pressure sensitive adhesive to the bound edges of the book block; applying thereto a scrim; applying a second molten film of a hot melt pressure sensitive adhesive and affixing thereto a strip of kraft paper in registered relation to the book spine; wherein the pressure sensitive hot melt adhesive composition comprises:
(a) 20 to 35% by weight of an A-B-A block or A-B-A-B-A-B multi-block copolymer where the A component is styrene and the B component is butadiene or hydrogenated butadiene and the copolymer contains at least 28 parts styrene per 100 parts copolymer;
(b) 45 to 70% by weight of a compatible tackifying resin;
(c) 5 to 30% by weight of a plasticizing oil;
(d) 0 to 5% by weight of a petroleum derived wax; and
(e) 0.1 to 2% by weight of a stabilizer.

More particularly, the present invention is directed to the use of a hot melt adhesive composition especially adapted for the above described construction the hot melt adhesives containing as the block copolymer a multi-block styrene-butadiene copolymer containing at least 35 parts styrene per 100 parts copolymer.

It will be recognized that the present invention also encompasses book lining operations wherein the pressure sensitive adhesive is used in only one of the attachment operations and another adhesive used for the second attachment as well as operations wherein the lining is formed from only the scrim or wherein only the kraft or where two layers of scrim and/or kraft are employed for reinforcement.

The spine of the resultant lined book remains flexible and produces an easy opening book.

DETAILED DESCRIPTION OF THE PREFERRED EMBODIMENTS

The primary component of the adhesive compositions used in the present invention are block or multi-block copolymers having the general configuration:

A-B-A or A-B-A-B-A-B- wherein the polymer blocks A are non-elastomeric styrene blocks while the elastomeric polymer blocks B are butadiene or butadiene which is partially or substantially hydrogenated as taught, for example, in U.S. Pat. No. 3,700,633. Selected conditions may be employed for example to hydrogenate the elastomeric butadiene block while not so modifying the styrene polymer blocks. Other conditions may be chosen to hydrogenate substantially uniformly along the polymer chain, both the elastomeric and nonelastomeric blocks thereof being hydrogenated to practically the same extent, which may be either partial or substantially complete. Further, they may be linear or branched. Typical branched structures contain an elastomeric portion with at least three branches which can radiate out from a central hub or can be otherwise coupled together.

Typical of the rubbery copolymers useful herein are the polystyrene-polybutadiene-polystyrene, and e.g. polystyrene-poly-(ethylenebutylene)-polystyrene. These copolymers may be prepared using methods taught, for example, in U.S. Pat. Nos. 3,239,478; 3,427,269; 3,700,633; 3,753,936; and 3,932,327. Alternatively, some may be obtained from Shell Chemical Co. under the trademarks Kraton 1101, 1102, 1650, 1652 and 1657 and from Phillips Chemical Co. under the trademarks Solprene 418 and 423.

Most preferred for use herein are the linear A-B-A-B-A multi-block copolymers where the elastomeric block is butadiene and the nonelastomeric block is styrene and the latter is present in relatively high concentrations, i.e. at levels of 35% or above. Block copolymers marketed commercially at this time which meet the above described requirements are available from Firestone under the tradename Stereon 840A (57 parts butadiene and 43 parts styrene or Stereon SR7092 (50 parts butadiene and 50 parts styrene). Blends of these high styrene containing copolymers with other compatable block copolymers may also be employed.

The tackifying resins useful in the adhesive compositions can be hydrocarbon resins, synthetic polyterpenes, rosin esters, natural terpenes, and the like. More particularly, the useful tackifying the resins include any compatible resins or mixtures thereof such as (1) natural and modified rosins such, for example, as gum rosin, wood rosin, talloil rosin, distilled rosin, hydrogenated rosin, dimerized rosin, and polymerized rosin; (2) glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natured terpenes, e.g. styrene/terpene and alpha methyl styrene/terpene; (4) polyterpene resins having a softening point, as determined by ASTM method E28-58T, of from about 80° to 150° C.; the latter polyterpene resins generally resulting from the polymerization of terepene hydrocarbons, such as the bicylic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins having a Ball and Ring softening point of from about 70° to 135° C.; the latter resins resulting from the polymerization of monomers consisting of primarily of olefins and diolefins; also included are the hydrogenated aliphatic petroleum hydrocarbon resins; (7) aromatic petroleum hydrocarbon resins and the hydrogenated derivatives thereof; and (8) alicyclic petroleum hydrocarbon resins and the hydrogenated derivatives thereof. Mixtures of two or more of the above described tackifying resins may be required for some formulations.

The selection of the particular tackifying agent is, in large part, dependent upon the specific block copolymer employed. The preferred adhesive formulations for use herein which employ the linear multi-block Stereon type copolymers provide optimum properties when tackifiers of modified terpene having ring and ball softening point of about 100°-120° C. such as Zonatac 105 are employed.

Among the applicable stabilizers or antioxidants utilized herein are included high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency and, correspondingly, its reactivity; this steric hindrance thus providing the phenolic compound with its stabilizing properties. Representative hindered phenols include: 1,3,5-trimethyl 2,4,6-tris(3,5-di-tert-butyl-4-hydroxybenzyl)benzene; pentaerythrityl tetrakis-3(3,5-di-tert-butyl-4-hydroxyphenyl)propionate; n-octadecyl-3(3,5-di-tert-butyl-4-hydroxyphenyl)-propionate; 4,4'-methylenbis(2,6-tert-butylphenol); 4,4'-thiobis(6-tert-butyl-o-cresol); 2,6-di-tertbutylphenol; 6-(4-hydroxyphenoxy)-2,4-bis(n-octyl-thio)-1,3,5triazine; di-n-octadecyl 3,5-di-tert--butyl-4-hydroxy-benzylphosphonate; 2-(n-octylthio)ethyl 3,5-di-tert-butyl-4-hydroxy-benzoate; and sorbitol hexa[3-(3,5-di-tert-butyl-4-hydroxyphenyl)-propionate].

The performance of these antioxidants may be further enhanced by utilizing, in conjunction therewith known synergists such, for example, as thiodipropionate esters and phosphites, particularly useful is distearylthiodipropionate.

These stabilizers, if used, are generally present in amounts of about 0.1 to 1.5 weight percent, preferably 0.25 to 1.0%.

Various plasticizing or extending oils are also present in the composition in amounts of 5% to about 30%, preferably 5 to 25%, by weight in order to provide wetting action and/or viscosity control. The above broadly includes not only the usual plasticizing oils but also contemplates the use of olefin oligomers and low molecular weight polymers as well as vegetable and animal oil and their derivatives. The petroleum derived oils which may be employed are relatively high boiling materials containing only a minor proprotion of aromatic hydrocarbons (preferably less than 30% and, more particularly, less than 15% by weight of the oil). Alternatively, the oil may be totally non-aromatic. The oligomers may be polypropylenes, polybutenes, hydrogenated polyisoprene, hydrogenated polybutadiene, or the like having average molecular weights between about 350 and about 10,000. Vegetable and animal oils include glyceryl esters of the usual fatty acids and polymerization products thereof.

Various petroleum derived waxes may also be used in amounts less than about 15% by weight of the composition in order to impart fluidity in the molten condition of the adhesive and flexibility to the set adhesive, and to serve as a wetting agent for bonding cellulosic fibers. The term "petroleum derived wax" includes both paraffin and microcrystalline waxes having melting points within the range of 130°–225° F. as well as synthetic waxes such a low molecular weight polyethylene or Fisher-Tropsch waxes.

Additionally there may be added to the hot melt adhesive composition up to about 10% by weight of an ethylene vinyl acetate copolymer containing 17 to 42% vinyl acetate as a reinforcing agent and/or to promote adhesion to certain substrates.

The adhesive compositions are prepared by blending the components in the melt at a temperature of about 130°–200° C. until a homogeneous blend is obtained, approximately 2 hours. Various methods of blending are known to the art and any method that produces a homogeneous blend is satisfactory.

The resultant hot melt adhesives are applied to bond the scrim and/or kraft to form the book lining using techniques and materials as are conventional in the book binding art. In this regard, it is important to note that the adhesives of the present invention are compatible with any of the book backbone surfaces onto which they may be coated and without limitation to the particular binding method employed. Thus, the book block may be bound by any of the usual procesures, including but not limited to "perfect" binding with hot melt adhesive; burst binding with emulsion adhesive and then with hot melt adhesive; sewn and glued off with emulsion adhesive; or perfect or burst bound with emulsion adhesive. Further, the hot melt pressure sensitive adhesives of the invention may be applied directly to the adhesive coated backbone and the scrim applied thereto or the backbone may be covered with a combined end sheet or capping strip prior to application of the scrim. Materials used for this latter purpose are conventional and often comprise a paper which has some degree of stretch associated therewith.

This invention can be further illustrated by the following examples or preferred embodiments thereof, although it will be understood that these examples are included merely for purposes of illustration and are not intended to limit the scope of the invention unless otherwise specifically indicated.

EXAMPLE

Ten parts white USP mineral oil and 0.2 parts Irganox 1010 antioxidants were blended with 21 parts Stereon 840A at 325° F. When the blend was homogeneous, 9 additional parts oil were added followed by 60 parts Zonatac 105 Lite, a modified terpene tackifier.

The resulting pressure sensitive adhesive exhibited a viscosity (Brookfield thermosel Viscometer) of 1355 at 325° F. and 8060 at 250° F.

In order to show the ability of the hot melt adhesives of the present invention to bond the scrim and kraft liners onto a variety of substrates without restriction to their chemical composition, the adhesive produced above was tested directly on sample book blocks bound using different non-pressure sensitive hot melt adhesives as well as emulsion adhesives. Additional samples were prepared by coating the adhesive on different types of stretch paper used as capping strips. The sample book blocks were covered with scrim and kraft using the adhesive produced above and aged for 24 hours at 72° F. and 50% relative humidity. The sample lined blocks were then cut into one inch wide sections and the one inch strip of the scrim pulled from the bound book block using an Instron Tensile Testing machine at a rate of 2 inches per minute. The pounds of force (in pounds per inch) required to pull apart the lined construction was recorded as was the type of bond failure noted.

The sample constructions are described as follows:

Sample A: A perfect bound book block formed using as hot melt nonpressure sensitive adhesive based on a Stereon styrene butadiene multi-block copolymer.

Sample B: A perfect bound book block formed using a hot melt nonpressure sensitive adhesive bond on a Kraton styrene butadiene block copolymer.

Sample C: A book block capped with Stretch Paper A 4506-SN available from Arcon Coating Mills, Inc., Oceanside, N.Y.

Sample D: A book block capped with a stretch paper available from Kimberly Clark Corp., Laural, Wis.

Sample E: A perfect bound book block formed using an ethylene vinyl acetate copolymer emulsion.

The test results are shown below:

| Sample | Surface | Bond Strength | Failure Mode |
| --- | --- | --- | --- |
| A | Stereon hot melt | 21.5 | Cohesive |
| B | Kraton hot melt | 16.0 | Cohesive |
| C | Stretch Paper (Arcon) | 23.5 | Cohesive |
| D | Stretch Paper (K.C.) | 15.0 | Tear paper |
| E | EVA emulsion | 28.8 | Cohesive |

Similiar results would be obtained using other pressure sensitive hot melt adhesive compositions formed from styrene butadiene block or multiblock copolymers containing at least about 28 parts styrene per 100 parts copolymer.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

I claim:

1. A process for lining hard bound book blocks comprising the steps of applying a molten film of a hot melt pressure sensitive adhesive to the bound edges of the book block; applying thereto a scrim; applying a second molten film of a hot melt pressure sensitive adhesive and affixing thereto a strip of kraft paper in registered relation to the book spine; wherein the pressure sensitive hot melt adhesive composition comprises:
   (a) 20 to 35% by weight of an A-B-A block or A-B-A-B-A-B multi-block copolymer where the A component is styrene and the B component is butadiene or hydrogenated butadiene and the copolymer contains at least 28 parts styrene per 100 parts copolymer;
   (b) 45 to 70% by weight of a compatible tackifying resin;
   (c) 5 to 30% by weight of a plasticizing oil;
   (d) 0 to 5% by weight of a petroleum derived wax; and
   (e) 0.1 to 2% by weight of a stabilizer.

2. The process of claim 1 wherein the tackifier in the hot melt adhesive composition is any compatible resin or mixture thereof selected from the group consisting of (1) natural and modified rosins: (2) glycerol and pentaerythritol esters of natural and modified rosins; (3) copolymers and terpolymers of natured terpenes; (4) polyterpene resins having a softening point, as determined by ASTM method E28-58T, of from about 80° to 150° C.; (5) phenolic modified terpene resins and hydrogenated derivatives thereof; (6) aliphatic petroleum hydrocarbon resins having a Ball and Ring softening point of from about 70° to 135° C.; (7) aromatic petroleum hydrocarbon resins and the hydrogenated derivatives thereof; and (8) alicyclic petroleum hydrocarbon resins and the hydrogenated derivatives thereof.

3. The process of claim 1 wherein there is additionally present in the hot melt adhesive up to 10% of an ethylene vinyl acetate copolymer containing 17 to 42% vinyl acetate.

4. A book lined by the process of claim 1.

5. A process for lining hard bound book blocks comprising the steps of applying a molten film of a hot melt pressure sensitive adhesive to the bound edges of the book block; applying thereto a scrim; applying a second molten film of a hot melt pressure sensitive adhesive and affixing thereto a strip of kraft paper in registered relation to the book spine; wherein the pressure sensitive hot melt adhesive composition comprises:
   (a) 20 to 35% by weight of an A-B-A-B-A-B multi-block copolymer wherein the A component is styrene and the B component is butadiene and wherein the styrene component is present in an amount of at least 35 parts per 100 parts of the copolymer;
   (b) 45 to 70% by weight of a compatible tackifying resin;
   (c) 5 to 30% by weight of a plasticizing oil;
   (d) 0 to 5% by weight of a petroleum derived wax; and
   (e) 0.1 to 2% by weight of a stabilizer.

6. The process of claim 5 wherein the block copolymer in the adhesive comprises 57 parts butadiene and 43 parts styrene.

7. The process of claim 5 wherein the block copolymer in the adhesive comprises 50 parts butadiene and 50 parts styrene.

8. The process of claim 5 wherein the tackifier in the hot melt adhesive composition is any compatible resin or mixture thereof selected from the group consisting of (1) natural and modified rosins: (2) glycerol and pentaerythritol esters of natural and modified rosins; (3) copolymers and terpolymers of natured terpenes; (4) polyterpene resins having a softening point, as determined by ASTM method E28-58T, of from aboutg 80° to 150° C.; (5) phenolic modified terpene resins and hydrogenated derivatives thereof; (6) aliphatic petroleum hydrocarbon resins having a Ball and Ring softening point of from about 70° to 135° C.; (7) aromatic petroleum hydrocarbon resins and the hydrogenated derivatives thereof; and (8) alicyclic petroleum hydrocarbon resins and the hydrogenated derivatives thereof.

9. The process of claim 8 wherein the tackifying resin in the adhesive is a modified terpene resin having a Ring and Ball softening part of about 100°-120° C.

10. The process of claim 8 wherein the tackifying resin in the adhesive is an aromatic petroleum hydrocarbon resin or hydrogenated derivative thereof.

11. The process of claim 5 wherein there is additionally present in the hot melt adhesive up to 10% of an ethylene vinyl acetate copolymer containing 17 to 42% vinyl acetate.

12. A book lined by the process of claim 5.